United States Patent [19]

Yamamoto et al.

[11] Patent Number: 4,527,918

[45] Date of Patent: Jul. 9, 1985

[54] APPARATUS FOR BOTH PRINTING CHARACTERS AND PLOTTING GRAPHS

[75] Inventors: Takemi Yamamoto; Makoto Suzuki, both of Nagoya, Japan

[73] Assignee: Brother Kogyo Kabushiki Kaisha, Nagoya, Japan

[21] Appl. No.: 489,539

[22] Filed: Apr. 28, 1983

[30] Foreign Application Priority Data

May 10, 1982 [JP] Japan ............................ 57-68593[U]

[51] Int. Cl.³ .............................................. B41J 3/58
[52] U.S. Cl. .................................. 400/82; 101/93.12; 400/17; 400/18; 400/144.2
[58] Field of Search ................ 400/17, 82, 18, 144.2, 400/144.3, 149; 346/76 PH; 101/93.12

[56] References Cited

U.S. PATENT DOCUMENTS

| 3,858,509 | 1/1975 | Grundherr | 400/144.2 X |
| 3,874,492 | 4/1975 | Hurst | 101/93.05 X |
| 4,259,025 | 3/1981 | Jamieson | 400/18 |
| 4,441,109 | 4/1984 | Fujisawa | 400/18 X |
| 4,459,049 | 7/1984 | Howell et al. | 400/17 X |

FOREIGN PATENT DOCUMENTS 14064  1/1982  Japan ................................ 400/82

*Primary Examiner*—Paul T. Sewell
*Attorney, Agent, or Firm*—Moonray Kojima

[57] ABSTRACT

A printing apparatus having a first printing unit provided with a plurality of type elements and adapted to print characters and symbols and a second printing unit capable of plotting optionally, graphs and figures, and capable of attaining both high quality printing of characters and symbols and high-quality plotting of graphs and figures, and with good speed.

7 Claims, 4 Drawing Figures

APPARATUS FOR BOTH PRINTING CHARACTERS AND PLOTTING GRAPHS

BACKGROUND OF THE INVENTION

1. Field of the Invention

This invention relates to a printing apparatus capable of both printing characters, on the basis of input data represented by character codes, and plotting figures, on the basis of graphic data applied thereto.

2. Description of the Prior Art

A conventional printing apparatus of the type mentioned above is designed to print characters in dot matrices on the basis of input character codes applied thereto, and to plot figures in dots, on the basis of graphic codes applied thereto. The character codes and graphic codes are generally entered by means of a keyboard. This conventional printing apparatus is deficient in a significant respect, namely, that although it is capable of optionally plotting figures and graphs, the printing quality is unsatisfactory and the characters so printed leave much to be desired.

On the other hand, a typewheel type printing apparatus, equipped with a typewheel having a plurality of type elements, is capable of printing characters of high quality, but, it is incapable of optionally plotting figures and graphs because of the limited number of type elements available on the wheel.

Moveover, a printing apparatus having a recording pen adapted to move in two dimensions, is optionally capable of plotting figures and graphs, but, disadvantageously, the quality of the printed characters made by such an apparatus is unsatisfactory and moreover the recording speed is not sufficiently high.

Thus, there exists in the art, a need for a printing apparatus which can print characters and symbols and plot figures and graphs, both of high quality and with high speed.

SUMMARY OF THE INVENTION

Accordingly, an object of the invention it so provide a printing apparatus, which is of simple construction, and which is capable of printing characters of high quality, and optionally of plotting figures and graphs of high quality, and both with commercially acceptable speeds.

The foregoing and other objects are attained by the invention which encompasses a printing apparatus comprising a platen for supporting sheet; a first printing unit having a plurality of type elements, disposed adjacent to the platen and adapted to be movable along a printing line for printing characters or symbols on the recording sheet with the type elements; a second printing unit disposed adjacent to the platen and adapted to be movable along a printing line for plotting figures and graphs; a first buffer memory which memorizes character codes for the first printing unit; a second buffer memory which memorizes graphic data for the second printing unit; and control means which discriminates input data between character code data and graphic data, memorizes the input data in the respective corresponding memories, searches and obtains data from the first or second buffer memory corresponding to a print command signal upon reception of that print command signal and sends the obtained data to the appropriate first or second printing unit.

DETAILED DESCRIPTION OF PREFERRED EMBODIMENTS

Figure 1:
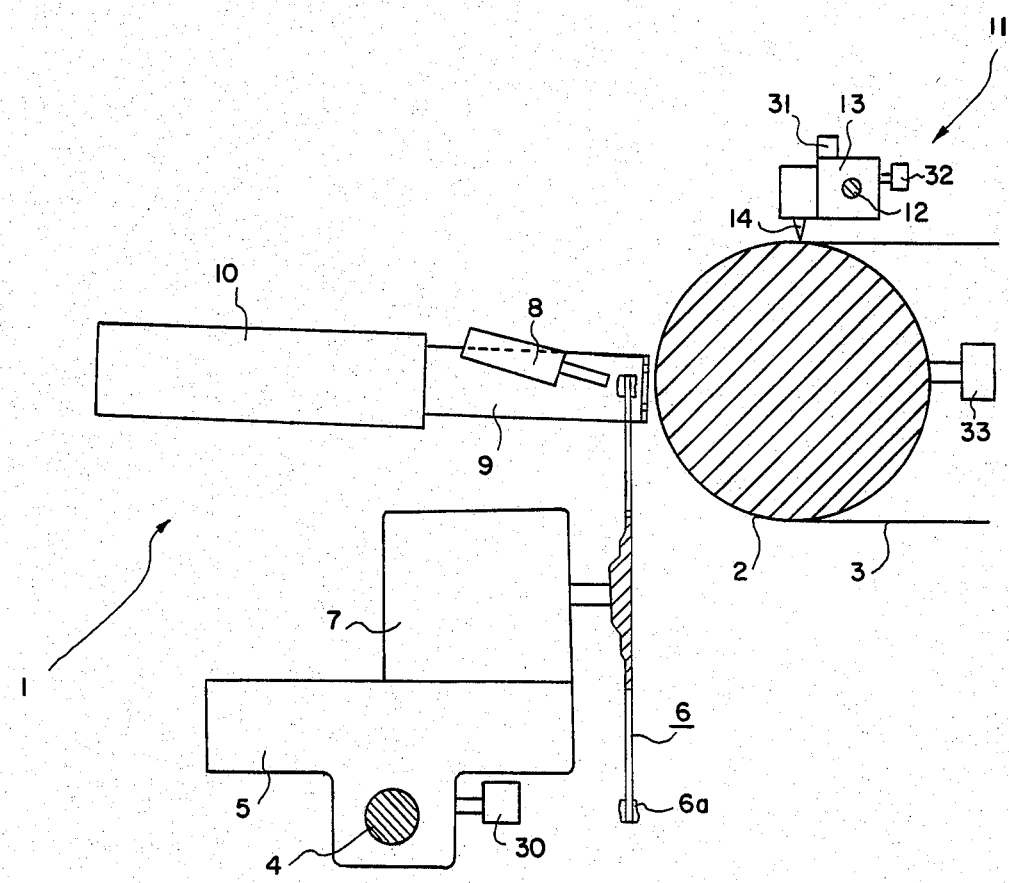
FIG. 1 is a fragmentary side elevational view, which is partly in cross section, depicting an illustrative embodiment of the invention.

Referring now to FIG. 1, a first printing unit 1 is mounted on a carriage 5 adapted to reciprocate, such as by means of motor 30, on a first guide rod 4 fixed in parallel to a platen 2, which is itself rotated by means of a stepping motor 33. A recording sheet 3 is supported on the platen 2. The first printing unit 1 comprises a type wheel 6, which is commonly known as a Daisy-type wheel, having a plurality of type elements 6a, each representing a character or symbol and formed on the circumference of the type wheel and adapted to be selectively turned by means of a stepping motor 7, a printing hammer 8 for striking a selected type element 6a when type element 6a is brought into alignment with the printing position, to print the corresponding character or symbol on recording sheet 3, and an ink ribbon 9 extending through a space between type elements 6a and recording sheet 3. A ribbon cassette 10 containing ribbon 9 may be used.

A second printing unit 11, which is a plotter, comprises a second guide rod 12 fixedly disposed parallel to the axial direction of the platen 2, a carriage mounted on second guide rod 12, adapted to reciprocate in the axial direction of platen 2 by means of stepping motor 32, and to turn on guide rod 12 by means of an electromagnetic unit 31, and a recording device 14, such as a ballpoint pen, mounted on carriage 13 for plotting figures, graphs and the like, on recording sheet 3.

Figure 2:
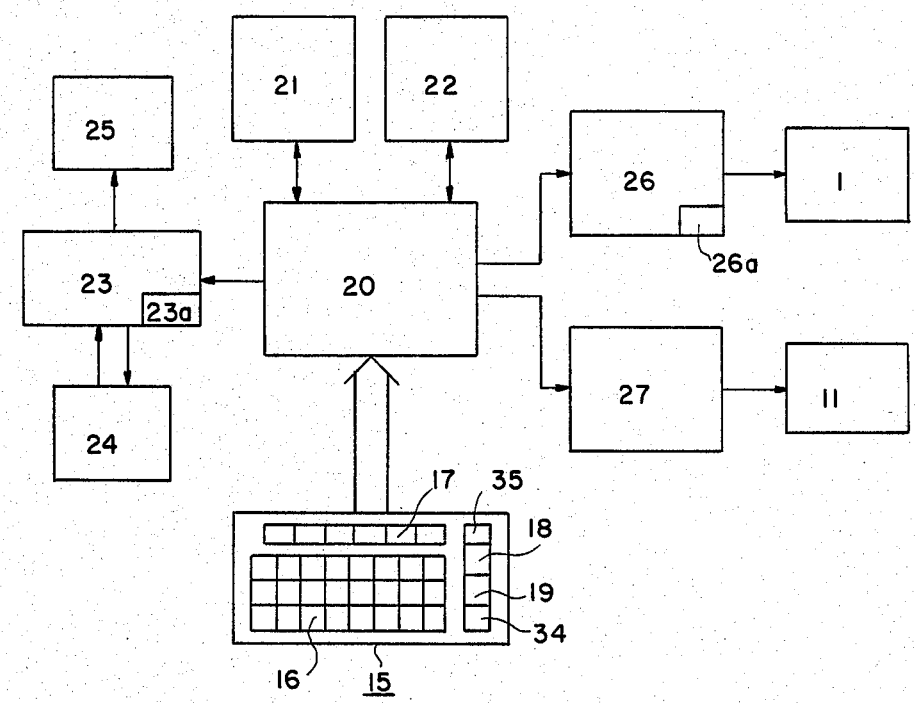
FIG. 2 is a block diagram depicting the electrical connection and components of the invention.

Turning to FIG. 2, a plurality of character keys 16, a plurality of keys 17, a print mode key 18 for selecting the printing mode and a plotting mode key 19 for selecting the plotting mode, are arranged on a keyboard 15. Character code data having a header represented, for example, by "0" or graphic data having a header represented, for example, by "1" is sent to a control circuit 20 when character key 16 or numeric key 18 is depressed after a printing mode has been selected by depressing print mode key 18 or when numeric key 17 is depressed after plotting mode has been selected by depressing plotting mode key 19, respectively.

Upon depressing numeric key 17, graphic data is formed by providing values representing the distances of movement of the recording pen along the X coordinate axis and along the Y coordinate axis, respectively, of imaginary coordinates or recording sheet 3, such as by rotation of platen 2 by motor 33, and axial movement of carriage 13 by motor 32.

Figure 3:
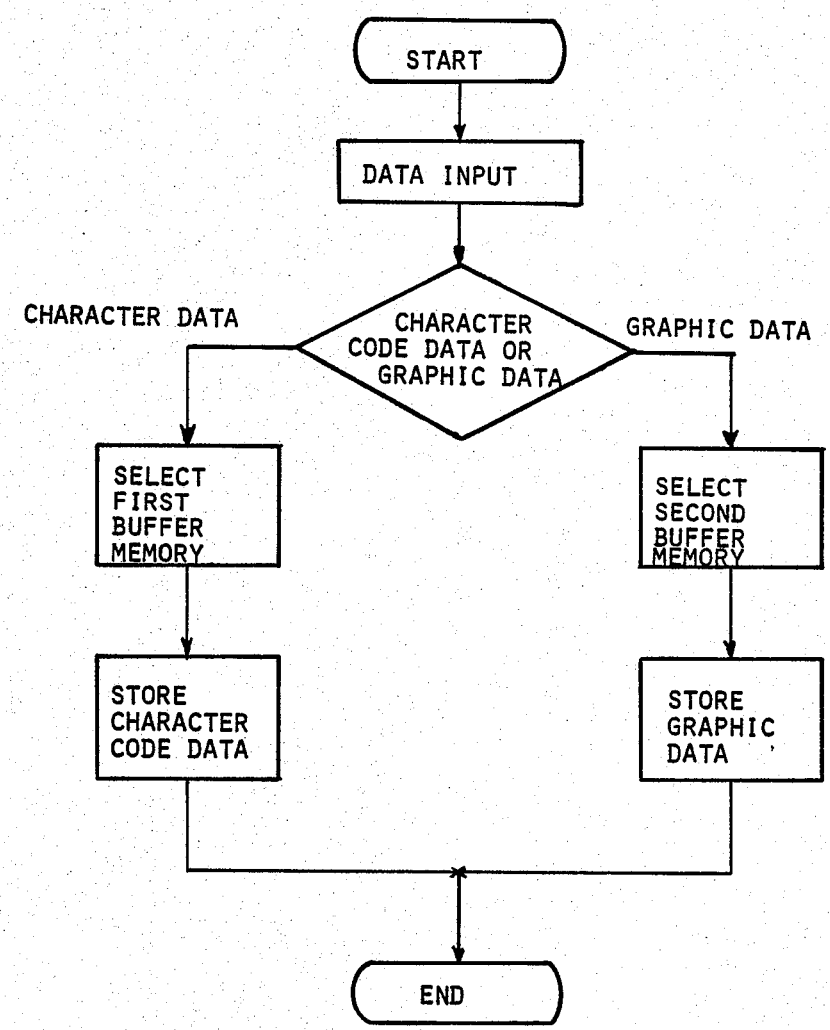
FIG. 3 is a flow diagram depicting the respective processes for memorizing character code data and graphic data.

Control circuit 20 discriminates between the character code data and graphic data, comprising the input data, on the basis of the header (e.g. "0" or "1") of the input data. As shown in FIG. 2 and FIG. 3, when character code data or graphic data is given to control circuit 20, control circuit 20 stores the character code data or the graphic data, in a first buffer memory 21 or a second buffer memory 22, respectively. Furthermore, as shown in FIG. 2, control circuit 20 sends the character code data or graphic data, written in first buffer memory 21 or second buffer memory 22, respectively, to a display control circuit 23.

Upon reception of the character code data, display control circuit 23 stores the character code data in a buffer memory 23a and searches and obtains character pattern data from a character table 24, in which the character pattern data corresponding to characters is stored beforehand, on the basis of the character code data and sends the character pattern data to a display unit 25, which may be a CRT, for example, to display the characters given through the operation of the keyboard, for example, in a dot matrix system.

When grapic data is given to display control circuit 23, display control circuit 23 stores the graphic data, as described above, in buffer memory 23a and composes dot pattern data on the basis of the graphic data written in buffer memory 23a. Then, the dot pattern data thus composed is given to display unit 25 to display the corresponding figure in a dot matrix system.

When a print key(shown as 34)provided on keyboard 15 is depressed, control circuit 20, searches and obtains the character code data stored in first buffer memory 21 and sends that data to a printer control circuit 26. When a plot key(shown as 35)provided on keyboard 15 is depressed, control circuit 20, searches and obtains graphic data stored in second buffer memory 22 and sends that data to a plotter control circuit 27.

Printer control circuit 26 searches and obtains printing data, on the basis of character code data given thereto from a memory 26a which stores printing data governing distance of movement of the carriage 5, angle of turning of type wheel 6 and impact force of printing hammer 8, and sends the printing data to first printing unit 1, so that carriage 5, stepping motor 7 and printing hammer 8 are driven on the basis of the printing data, to print the characters and symbols given through the operation of the keys, on the recording sheet 3.

Figure 4:
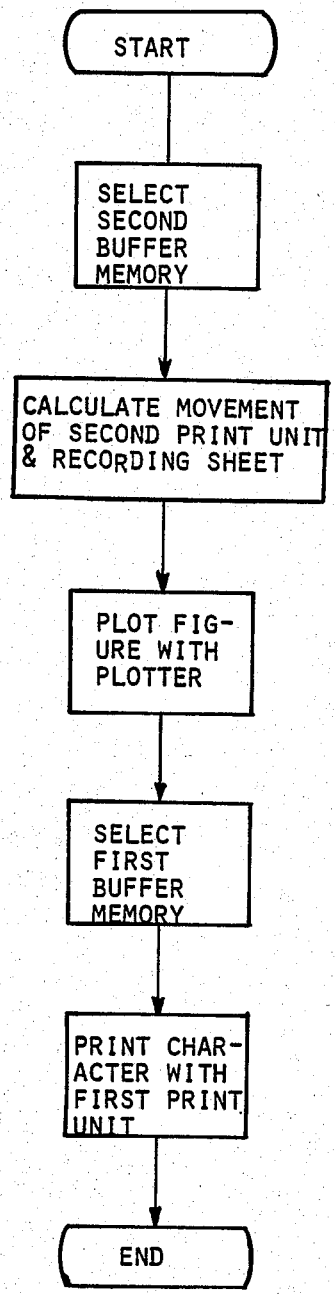
FIG. 4 is a flow diagram depicting character printing operation and plotting operation.

As shown in FIG. 4, plotter control circuit 27 calculates the distance of movement of recording device 14 on the basis of the graphic data given thereto, brings the recording device 14 into contact with recording sheet 3 by driving an electromagnetic unit 31, which drives carriage 13 to move recording pen 14 axially of platen 2 and moves recording sheet 3 via motor 33 in the circumferential direction of platen 2, thereby to plot the figure given through the operation of the keys.

As described, according to the present invention, since characters are printed with type elements 6a, which elements are selected on the basis of character code data written in first buffer memory 21, high quality printing is attained. Moreover, the invention can plot in a stroke process through relative movement of recording device 14 along two axis perpendicular to each other, on the basis of graphic data written in second buffer memory 22.

The motors 30,32,33 are shown representationally, and their electrical connections to control circuits are designed symbollically as printing units 1 and 11.

Advantageously, the printing and plotting operation of this invention may be executed separately from each other, or in parallel operation with each other.

Furthermore, although in this embodiment a ballpoint pen is employed as the recording device 14, in the second print unit 11, such second plotting unit, may also employ the so-called dot printer, which plots graphs and figures using a dot matrix system.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A printing apparatus comprising
   a platen for supporting a recording sheet;
   a first printing unit having a plurality of type elements and disposed adjacent to the platen so as to be movable along a printing line to print characters or symbols with the type elements on one side of the recording sheet, said first printing unit comprising a printing control unit and a printer;
   a second printing unit disposed adjacent to the platen so as to be movable along a printing line for plotting graphs and figures on said one side of said recording sheet, said second printing unit comprising a plotting control unit and a plotting device;
   a keyboard having a plurality of character keys, a plurality of numeric keys, a printing mode selecting key, a plotting mode selecting key, a print key and a plot key;
   a first buffer memory for memorizing character code data for controlling the first printing unit;
   a second buffer memory for memorizing graphic data for controlling the second printing unit; and
   control means having logic for
   discriminating between character code data and graphic code data upon operation of said printing mode selecting key and subsequent operation of one or more of said plurality of character keys or numeric keys, or upon operation of said plotting mode selecting key and subsequent operation of one or more of said plurality of numeric keys;
   storing said character data in said first buffer memory, and said graphic data in said second buffer memory; and
   searching and obtaining said character data from said first buffer memory upon operation of said print key or graphic data from said second buffer memory upon operation of said plot key, and thereafter sending said character code data to said printing control unit of said first printing unit thereby to cause said printer to print corresponding characters or numerals or symbols on said recording paper, and sending said graphic code data to said plotting control unit of said second printing unit whereat responsive to said graphic code data said plotting control unit calculates movement of said recording paper and movement of said plotting device and causes said plotting device to plot the calculated movement of said recording paper; and
   wherein said printer and said plotting device are operated singly or concurrently with each other.

2. The apparatus of claim 1, wherein said printing control means sends, on the basis of the character code data, searched and obtained from the first buffer memory, printing data to the first printing unit.

3. The apparatus of claim 1, wherein said printing control means is adapted to send predetermined printing data corresponding to the character code data given thereto to the first printing unit and said plotting control means is adapted to send predetermined data corresponding to the graphic data given thereto to the second printing unit.

4. The apparatus of claim 3, wherein said plotting control means gives, on the basis of the graphic data searched and obtained from the second buffer memory, data to the second printing unit.

5. The apparatus of claim 1, wherein said first and second printing units are guided for movement by means of first and second guide shafts which are disposed adjacent to and in parallel to the platen, respectively.

6. The apparatus of claim 1, wherein said printing head is a Daisy type printing head and the printing element of said second printing unit is a ball-point pen.

7. The apparatus of claim 5, wherein said first guide shaft is disposed below the printing position on the platen, while the second guide shaft is disposed above the printing position on the platen.

* * * * *